United States Patent
Dashe et al.

(10) Patent No.: US 9,088,649 B2
(45) Date of Patent: *Jul. 21, 2015

(54) SYSTEMS AND METHODS FOR CUSTOMER CONTACT

(75) Inventors: Jeremy A. Dashe, Bainbridge Island, WA (US); Jon R. Jay, Seattle, WA (US); Donald L. Kaufman, Kirkland, WA (US); Yung-Chun Lin, Seattle, WA (US); Joseph D. Sullivan, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 1404 days.

This patent is subject to a terminal disclaimer.

(21) Appl. No.: 12/547,387

(22) Filed: Aug. 25, 2009

(65) Prior Publication Data

US 2011/0051920 A1    Mar. 3, 2011

(51) Int. Cl.
| | |
|---|---|
| H04M 3/00 | (2006.01) |
| H04M 3/42 | (2006.01) |
| G06Q 10/10 | (2012.01) |
| H04M 3/51 | (2006.01) |
| H04M 7/00 | (2006.01) |

(52) U.S. Cl.
CPC ........... *H04M 3/42365* (2013.01); *G06Q 10/10* (2013.01); *H04M 3/5125* (2013.01); *H04M 7/0024* (2013.01)

(58) Field of Classification Search
USPC .......................... 379/265.01–265.14; 370/352
See application file for complete search history.

(56) References Cited

U.S. PATENT DOCUMENTS

| | | | |
|---|---|---|---|
| 5,825,870 | A | 10/1998 | Miloslavsky |
| 6,026,087 | A | 2/2000 | Mirashrafi et al. |
| 6,144,670 | A | 11/2000 | Sponaugle et al. |
| 6,199,096 | B1 | 3/2001 | Mirashrafi et al. |
| 6,212,192 | B1 | 4/2001 | Mirashrafi et al. |
| 6,310,941 | B1 | 10/2001 | Crutcher et al. |
| 6,389,132 | B1 | 5/2002 | Price |
| 6,408,066 | B1 | 6/2002 | Andruska et al. |
| 6,424,709 | B1 | 7/2002 | Doyle et al. |
| 6,487,290 | B1 | 11/2002 | Le Grand |

(Continued)

FOREIGN PATENT DOCUMENTS

| | | |
|---|---|---|
| JP | 10-262117 | 9/1998 |
| JP | 11-112666 | 4/1999 |

(Continued)

OTHER PUBLICATIONS

U.S. Appl. No. 13/620,441, filed Sep. 14, 2012, Brandwine et al.

(Continued)

*Primary Examiner* — William Deane, Jr.
(74) *Attorney, Agent, or Firm* — Knobbe Martens Olson & Bear, LLP

(57) ABSTRACT

A user of a personal computing device may identify an item of interest displayed in a user interface provided by a network-based service and would like to obtain more information. The user may submit one or more electronic contact requests to a contact service in communication with a contact distribution system in order to obtain more information. The contact distribution system determines accurate, real-time availability of service agents and enables communications between the customer and an agent to be established in accordance with user contact information provided by the user.

26 Claims, 12 Drawing Sheets

(56) References Cited

U.S. PATENT DOCUMENTS

| | | | |
|---|---|---|---|
| 6,512,825 B1 | 1/2003 | Lindholm et al. | |
| 6,707,811 B2 | 3/2004 | Greenberg et al. | |
| 6,731,393 B1 | 5/2004 | Currans et al. | |
| 6,791,974 B1 | 9/2004 | Greenberg | |
| 6,798,877 B2 | 9/2004 | Johnson et al. | |
| 6,826,194 B1 | 11/2004 | Vered et al. | |
| 6,914,899 B2 | 7/2005 | Siegrist et al. | |
| 7,075,921 B2 | 7/2006 | Siegrist et al. | |
| 7,085,366 B2 | 8/2006 | O'Neil | |
| 7,092,509 B1 | 8/2006 | Mears et al. | |
| 7,149,747 B1 | 12/2006 | Cheng et al. | |
| 7,158,628 B2 | 1/2007 | McConnell et al. | |
| 7,184,540 B2 | 2/2007 | Dezonno et al. | |
| 7,203,188 B1 | 4/2007 | Siegrist et al. | |
| 7,315,518 B1 | 1/2008 | Siegrist | |
| 7,367,051 B1 | 4/2008 | Siegrist et al. | |
| 7,581,230 B1 | 8/2009 | Chen et al. | |
| 7,706,521 B2 | 4/2010 | Gavagni et al. | |
| 7,949,999 B1 | 5/2011 | Willeford et al. | |
| 7,958,518 B1 | 6/2011 | Willeford et al. | |
| 8,046,309 B2 | 10/2011 | Evans et al. | |
| 8,249,245 B2 | 8/2012 | Jay et al. | |
| 8,340,275 B1 | 12/2012 | Brandwine et al. | |
| 8,503,664 B1 | 8/2013 | Kaufman | |
| 8,542,816 B2 | 9/2013 | Kaufman et al. | |
| 8,600,035 B2 | 12/2013 | Jay et al. | |
| 8,848,898 B2 | 9/2014 | Jay et al. | |
| 8,873,735 B1 | 10/2014 | Brandwine et al. | |
| 8,879,717 B2 | 11/2014 | Jay et al. | |
| 8,958,542 B1 | 2/2015 | Kaufman | |
| 2001/0014143 A1 | 8/2001 | Kuhn | |
| 2001/0054064 A1 | 12/2001 | Kannan | |
| 2002/0196927 A1* | 12/2002 | Johnson et al. | 379/265.02 |
| 2003/0169870 A1 | 9/2003 | Stanford | |
| 2003/0220866 A1* | 11/2003 | Pisaris-Henderson et al. | 705/37 |
| 2004/0186778 A1* | 9/2004 | Margiloff et al. | 705/14 |
| 2005/0071241 A1 | 3/2005 | Flockhart et al. | |
| 2005/0111653 A1 | 5/2005 | Joyce et al. | |
| 2006/0143058 A1 | 6/2006 | Brunet et al. | |
| 2006/0198504 A1 | 9/2006 | Shemisa et al. | |
| 2006/0203993 A1 | 9/2006 | Busey et al. | |
| 2007/0160188 A1 | 6/2007 | Sharpe et al. | |
| 2007/0201684 A1 | 8/2007 | Boghani | |
| 2007/0208590 A1 | 9/2007 | Dorricott et al. | |
| 2007/0286180 A1 | 12/2007 | Marquette et al. | |
| 2008/0034354 A1 | 2/2008 | Brughton et al. | |
| 2008/0082341 A1 | 4/2008 | Blair | |
| 2008/0084989 A1* | 4/2008 | Dhanakshirur | 379/309 |
| 2008/0147470 A1 | 6/2008 | Johri et al. | |
| 2008/0187125 A1 | 8/2008 | Siegrist | |
| 2008/0229404 A1 | 9/2008 | Siegrist et al. | |
| 2008/0247525 A1* | 10/2008 | LeBlanc et al. | 379/101.01 |
| 2008/0260135 A1 | 10/2008 | Siegrist | |
| 2008/0267377 A1 | 10/2008 | Siegrist | |
| 2008/0276183 A1 | 11/2008 | Siegrist et al. | |
| 2008/0288349 A1 | 11/2008 | Weisberg et al. | |
| 2009/0010414 A1 | 1/2009 | Siegrist | |
| 2009/0154688 A1 | 6/2009 | Jay et al. | |
| 2009/0156178 A1 | 6/2009 | Elsey et al. | |
| 2009/0228493 A1 | 9/2009 | Kephart et al. | |
| 2009/0261157 A1* | 10/2009 | Kumar et al. | 235/375 |
| 2009/0281967 A1 | 11/2009 | Jaffer et al. | |
| 2009/0316687 A1* | 12/2009 | Kruppa | 370/352 |
| 2010/0131382 A1 | 5/2010 | Fitzsimmons | |
| 2010/0281398 A1* | 11/2010 | Melideo | 715/753 |
| 2011/0051920 A1 | 3/2011 | Dashe et al. | |
| 2011/0051922 A1 | 3/2011 | Jay et al. | |
| 2011/0066498 A1* | 3/2011 | Wojcicki et al. | 705/14.55 |
| 2011/0087548 A1* | 4/2011 | Schauser et al. | 705/14.53 |
| 2011/0286444 A1* | 11/2011 | Petrovykh | 370/352 |
| 2011/0310891 A1* | 12/2011 | Howe et al. | 370/352 |
| 2011/0320200 A1 | 12/2011 | Broman et al. | |
| 2012/0101865 A1 | 4/2012 | Zhakov | |
| 2015/0023490 A1 | 1/2015 | Jay | |

FOREIGN PATENT DOCUMENTS

| | | |
|---|---|---|
| JP | 2002-033834 | 1/2002 |
| JP | 2002-57801 | 2/2002 |
| JP | 2002-108794 | 4/2002 |
| JP | 2002-314691 | 10/2002 |
| JP | 2003-022382 | 1/2003 |
| JP | 2003-87411 | 3/2003 |
| JP | 2003-122890 | 4/2003 |
| JP | 2004-343220 | 12/2004 |
| JP | 2007-265325 | 10/2007 |
| JP | 2008-172487 | 7/2008 |
| JP | 2008-182353 | 8/2008 |
| WO | WO 98/01987 A | 1/1998 |

OTHER PUBLICATIONS

Japanese Office Action, Re JP Application No. 2014-001969, dated Oct. 14, 2014.

* cited by examiner

SYSTEMS AND METHODS FOR CUSTOMER CONTACT

BACKGROUND

In an increasingly networked society, users frequently use data networks to perform a variety of tasks formerly performed in person. For example, a user may purchase an item from a network-based retailer using his or her computing device. In yet another example, the user may employ a banking service to check account balances, pay bills, schedule transfers, and the like. As a result, providers of network-based services face a number of pre- and post-sale contacts with their customers. Systems, such as call centers have been developed as a centralized, scalable mechanism to handle the volume of calls across a variety of contact contexts, including, for example, sales and marketing contacts, technical support, and billing. However, call centers suffer from a variety of shortcomings.

For example, the availability of call center agents is typically based upon predetermined hours. However, predetermined hours of contact availability may become out of synch or outdated with respect to actual agent availability with relative ease. For example, special events (e.g., holidays), time changes, network outages, over/understaffing, and the like may each influence the availability of agents in ways that are not reflected in hourly availability ranges. As a result, the availability of call center agents may be incorrectly reported to users, potentially frustrating users who wish to contact a call center agent.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
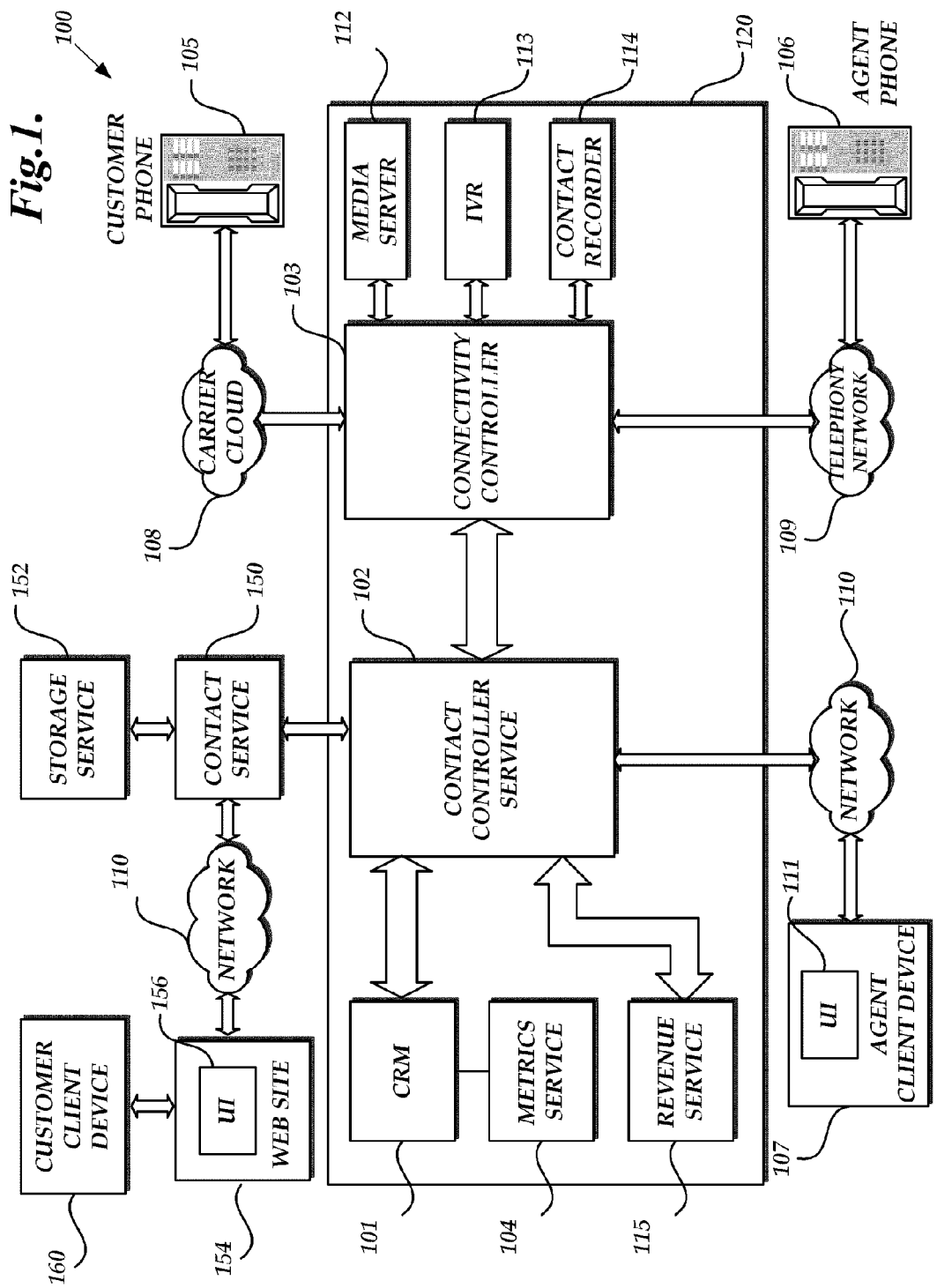
FIG. 1 is a schematic block diagram of an illustrative contact service in communication with a call distribution system for managing contacts between customers and customer service agents.

Generally described, aspects of the present disclosure relate to providing highly accurate, up to date information regarding the availability of service agents to users of network-based services (e.g., websites). Further aspects of the disclosure relate to facilitating contact between the users and service agents. Embodiments discussed below may refer to the users as customers and the service agents as customer service agents. However, it may be understood that users are not limited to customers but may include any users of network-based services.

In this regard, a contact service is described that receives customer requests for the availability of customer service agents and for contact with customer service agents (CSAs). For example, a customer using a customer computing device, such as a personal computer, may identify an item of interest presented by a network-based service and may desire to communicate with a CSA regarding the item of interest. This network-based service may be anything that provides a good, service, or information that is of interest to the customer. Accordingly, the network-based service may include network-based retailers such as those which sell items for purchase to the customer, network-based sources of entertainment and/or information (e.g., network-based encyclopedias, media sharing, etc), network-based social networking services which enable users to share content with one another, and the like. In one embodiment, using his or her computing device, the customer may request contact agent availability and contact with service agents.

As described in greater detail below, these customer requests may be directed to the contact service via the network-based service. The contact service may submit the requests to a contact distribution system for the generation of responses. These responses may be obtained by the contact service and submitted to the network-based service for display to the customer. For example, the network-based service may generate user interfaces that incorporate the responses for display to the user.

More specifically, the contact distribution system may communicate with one or CSAs in order to determine agent availability and to determine agent responses to customer queries. The contact distribution system may further establish contact between customers and CSAs based upon customer contact information provided to the contact service and report the status of the contact to the contact service. Because the contact distribution system may determine CSA availability directly from the CSAs, the likelihood that the agent availability information returned by the contact distribution system is out of date or incorrect is low. Thus, customers may be presented with accurate agent availability information.

In one non-limiting example, the network-based service may be a network-based retail service, implemented via a website, e.g., a website that sells music and videos. Using a personal computing device, the customer may identify an item of interest displayed for sale by the network-based retail service, for example, a movie. In addition to identifying the item of interest, the customer may also have one or more questions regarding the movie, such as how the movie is shipped. The customer, from her personal computing device, may submit a request to the retailer service's website for a user interface (e.g., a web page) including information regarding contact with a CSA. For example, the customer may submit a request for a user interface that displays an agent status.

This request may, in turn, be sent from the website to the contact service for response. The contact service may communicate with the contact distribution system to obtain the real-time agent status, which is returned to the website. The website may generate the requested web page, based upon the returned agent status, for display by the customer's computing device to the customer.

The agent status may be further stored or cached by the contact service for a limited time in order to reduce the frequency with which requests for agent status are directed to the contact distribution system. For example, if another customer requests assistance regarding the same movie within the limited time period, the contact service may return the previously determined agent status, rather than submitting a new request to the contact distribution service.

In another non-limiting embodiment, the customer may submit customer contact information to the website. The customer contact information, when provided to the content distribution service, may enable the contact distribution service to initiate communication between the customer service agent and the customer. The customer contact information may include information regarding any manner of communication available with the customer.

A contact request, including the customer contact information, may be transmitted to the contact service. The contact service, in turn, may submit the customer contact information to the contact distribution system. The contact distribution system may attempt to contact the customer using the contact information and return a corresponding contact status to the contact service. The returned contact status may be provided to the website by the contact service, enabling the preparation of another user interface, which includes the contact status, for display to the customer. In additional non-limiting embodiments, once contact is established between the customer and the service agent, the contact service may relay customer queries and agent responses between the service agent and customer.

In further embodiments, the contact service and contact distribution service may generate and/or employ additional information in order to coordinate the receipt and transmission of user contact requests and responses between the website and the contact distribution service. In one example, a unique identifier, referred to as a contact identifier (contact ID), may be generated by the contact service for identification of customer contact requests and shared with the website and customer client device.

In another example, the contact distribution service may generate and store one or more identifiers which uniquely identify contacts generated by the contact distribution system. The contact distribution service may generate a first identifier, referred to as a contact leg identifier (contact leg ID), to identify a contact made between the contact distribution service and the customer. The contact distribution service may also generate a second identifier, referred to as an agent leg identifier (agent leg ID), to identify a contact made between the contact distribution service and an agent in response to the contact made between the contact distribution service and the customer. These identifiers may be provided by the contact distribution service to the contact service, which may further associate the contact leg ID and agent leg ID with the contact ID and store the contact leg ID, agent leg ID, and association.

When establishing contact between the CSAs and the customer, the contact service may further associate these identifiers with other selected information generated while establishing contact, and further store these identifiers and associations. In this manner, requests from the customer may be associated with the correct contact by the contact service and contact distribution system, enabling with responses generated by the contact service and contact distribution system to be appropriately delivered to the website in use by the customer.

With reference to FIG. 1, an embodiment of an operating environment 100 for automatically distributing contacts from customers to customer service agents (CSAs) is illustrated. In the operating environment 100, a customer may employ a customer client device 160 to communicate with a network-based service implemented via a website 154. The website 154 may maintain or generate one or more user interfaces 156 capable of display by the customer client device 160. Should the customer have a problem or query regarding information displayed in one or more of the user interfaces 156 provided by the website 154, the customer may employ the user interfaces 156 to request information regarding customer service agents and, if necessary, request communication with a customer service agent. Requests for CSA information and contact with CSAs may be directed to a contact service 150 in communication with a contact distribution system 120 as discussed in greater detail below.

It will be recognized that many of the components described below are optional and that embodiments of the system 100 may or may not combine components. Components need not be distinct or discrete. Components may be reorganized in the system 100. The system 100 may be represented in a single physical server containing all of the subsystems described below or, alternatively, the system may be split into multiple physical servers.

The contact service 150 and website 154 may each be embodied in a plurality of components, each executing an instance of the respective contact service 150 or website 154. A server or other computing component implementing the contact service 150 or website 154 may include a network interface, memory, processing unit, and computer readable medium drive, all of which may communicate which each other may way of a communication bus. The network interface may provide connectivity over the network 110 and/or other networks or computer systems. The processing unit may communicate to and from memory containing program instructions that the processing unit executes in order to operate the contact service 150 or website 154. The memory generally includes RAM, ROM, and/or other persistent and auxiliary memory.

The customer client device may comprise any communication device capable to displaying a user interface from the website 154, such as a PC, a kiosk, a thin client, a home computer, and a dedicated or embedded machine. Further examples may include laptop or tablet computers, personal computers, personal digital assistants (PDAs), hybrid PDAs/mobile phones, mobile phones, electronic book readers, set-top boxes, and the like.

The website 154 may communicate with the customer client device 160 to transmit customer requests for contact with the CSAs. The requests may include requests for CSA information including, but is not limited to, an agent status representing a current availability of the CSAs to communicate with the customer, a contact status representing a status of the contact between the customer and the customer service agent in response to a request for contact, and an agent response to a customer query.

Responses to the customer requests may, in certain embodiments, take the form of user interfaces (UI) 156 generated by the website 154. User interfaces 156 may be generated using CSA information obtained from the contact service 150. User interfaces 156, in certain embodiments, may be further generated from template user interfaces. Such template user interfaces may be maintained by the website 154 and/or the contact service 150, a data store in communication with the website 154, and combinations thereof. In additional embodiments, the website 154 and/or the contact service 150 may also generate agent user interfaces 111 for use by CSAs, as discussed in greater detail below.

The website 154 may further communicate with the contact service 150 to obtain the CSA information. As discussed in greater detail below, the contact service 150 submits contact requests received from the website 154 to the contact distribution system 120 and returns responses to the website 154. The contact service 150 may further store at least a portion of the CSA information and other information generated when responding to the customer requests in a storage service 152.

Descriptions of illustrative embodiments of the contact distribution system 120 may be found in U.S. patent application Ser. No. 12/192,067, entitled "SYSTEM AND METHOD FOR AUTOMATED CALL DISTRIBUTION," the entirety of which is hereby incorporated by reference. The system 120 may include a customer relations module (CRM) 101, a contact controller service 102, a connectivity controller 103, and a metrics service 104, each of which may be represented in hardware, software, or a combination thereof. The system is responsible for allocating, routing, and maintaining connections between customer client devices 160 and CSAs. As discussed below, connections may be established between customer phones 105, CSA phones 106, and agent client devices 107. The system 100 may connect to customers and agents through telephony carriers 108 and 109 and data carriers 110.

In alternative embodiments, the phones 105, 106 may be supplemented with and/or replaced by other communication mechanisms. Examples may include, but are not limited to, computing devices capable of sending and receiving electronic mail, an SMS message, instant messaging, an electronic message that is published or posted for viewing by others, and a video message. The contact distribution system 120 may connect user client devices 160 and agent client devices 107 through one or more networks 110 as known to one of skill in the art.

In one embodiment, the CRM 101 enables the contact distribution system 120 to manage contacts and relations with its customers. The CRM 101 may be composed of several databases (not shown) and may have links (not shown) to other systems, both directly and indirectly related to customer contact management. For example, as discussed below, the CRM 101 may maintain and/or obtain customer information for use by the CSAs.

The contact controller service 102 handles incoming customer calls, and other functions including, but not limited to: tracking agent state/availability (i.e., which agents are available to handle an incoming customer call); maintaining (potentially out-of-order) logical queues (not shown) of customers on hold for a particular CSA or call types (while customers on hold may be connected to a media service 112); routing calls, i.e., matching an available agent to an incoming customer call; and forwarding information generated by the operation of the telephony subsystem (103 and attendant components) to the metrics service 104.

The metrics service 104 is typically connected to the contact controller service 102. This service stores information related to both customer contacts and CSAs. Additionally, it may create reports (such as SL reports) based on real-time and historic data. The metrics service may provide information to the contact controller service 102.

The connectivity controller 103 may handle the mechanics of manipulating telephone calls, using SIP signaling (voice over IP technology), expose functionality that allows other systems (e.g., the contact controller service) to manipulate calls, and propagate telephony events through the system 100. The connectivity controller 103 may connect customer phones 105 to agent phones 106. The connectivity controller 103 may make use of the following subsystems: a media server 112, an interactive voice response (IVR) system 113, and a call recorder system 114.

The media server 112 may handle the mechanics of playing announcements and hold music in a number of different contexts in the system. Customers may be connected to this server when they are placed on hold. This system may play "whispers" (i.e., informative introductory messages) to CSAs just before they are connected to a customer.

The interactive voice response system 113 may be a "robot" that sometimes handles customer contacts before customers are transferred to a live CSA. IVRs may obtain preliminary information used to route calls and/or classify call types.

The contact recorder system 114 may record customer contacts. The contact recorder may provide a common interface to record contacts that take or took place anywhere in the system 100.

A CSA will typically have two connections to the system: an agent client device, illustrated at 107, and a telephony connection, illustrated at 106. The agent client device 107 is capable of displaying a user interface 111 to the system 100 and may be any computing device. Those of skill in the art will recognize that one or more CSAs may be located in a traditional monolithic call center (wherein the CSAs and the system 100 are in close physical proximity). Alternatively, a CSA may be located in close proximity to other CSAs (as in a "call center"), but remote from the system (which would then be housed in a "data center"). As another alternative, one or more CSAs may be remote from both the system data center and other CSAs. The agent client device may include any sort of communication device capable to displaying a user interface from the contact distribution system 120, such as a PC, a kiosk, a thin client, a home computer, a dedicated or embedded machine. Further examples may include laptop or tablet computers, personal computers, personal digital assistants (PDAs), hybrid PDAs/mobile phones, mobile phones, electronic book readers, set-top boxes, and the like.

Similarly, the agent phone system 106 may include specialized phone equipment, VoIP equipment, complex PBX systems, off-the-shelf phones on traditional phone lines, and so forth. In some embodiments, agent phone systems 106 are not required to be connected via PBX or other telephone exchange systems. Moreover, for purposes of the present disclosure, a grouping of one or more CSAs, whether physically, in a monolithic call center or a data center; or logically, e.g., of CSAs who are not in close physical proximity to each other, may be referred to as an agent node.

The CSA user interface 111 displays content from the contact controller service 102 or the CRM 101. Such an interface may be a propriety application running on the computing machine. Alternatively, it may display a web page, browser, widget, applet, etc. generated or otherwise provided by the contact controller service 102 or CRM 101. In further embodiments, the CSA user interface 111 may display a web page, browser, widget, applet, etc. generated or otherwise provided by the network-based service. The link between the content distribution system 120 and the user interface 111 may be mediated by any of a host of data carriers and protocols, including HTTP, HTTPS, instant messaging, distributed memory, or a propriety protocol, or a combination of these.

Customers and customer phone systems, illustrated at 105, correspond to the end-users of the call system 100. Such customers may be connected to the content distribution system 120 via one of a host of telephony carriers 108. Such connections may also be established through newer, non-traditional protocols such as SIP, HTTP, IRC, other instant messaging protocols, and so forth. Customers may connect to the system using inexpensive phone equipment, complex PBX systems, or any other mechanism of communication.

Figure 2:
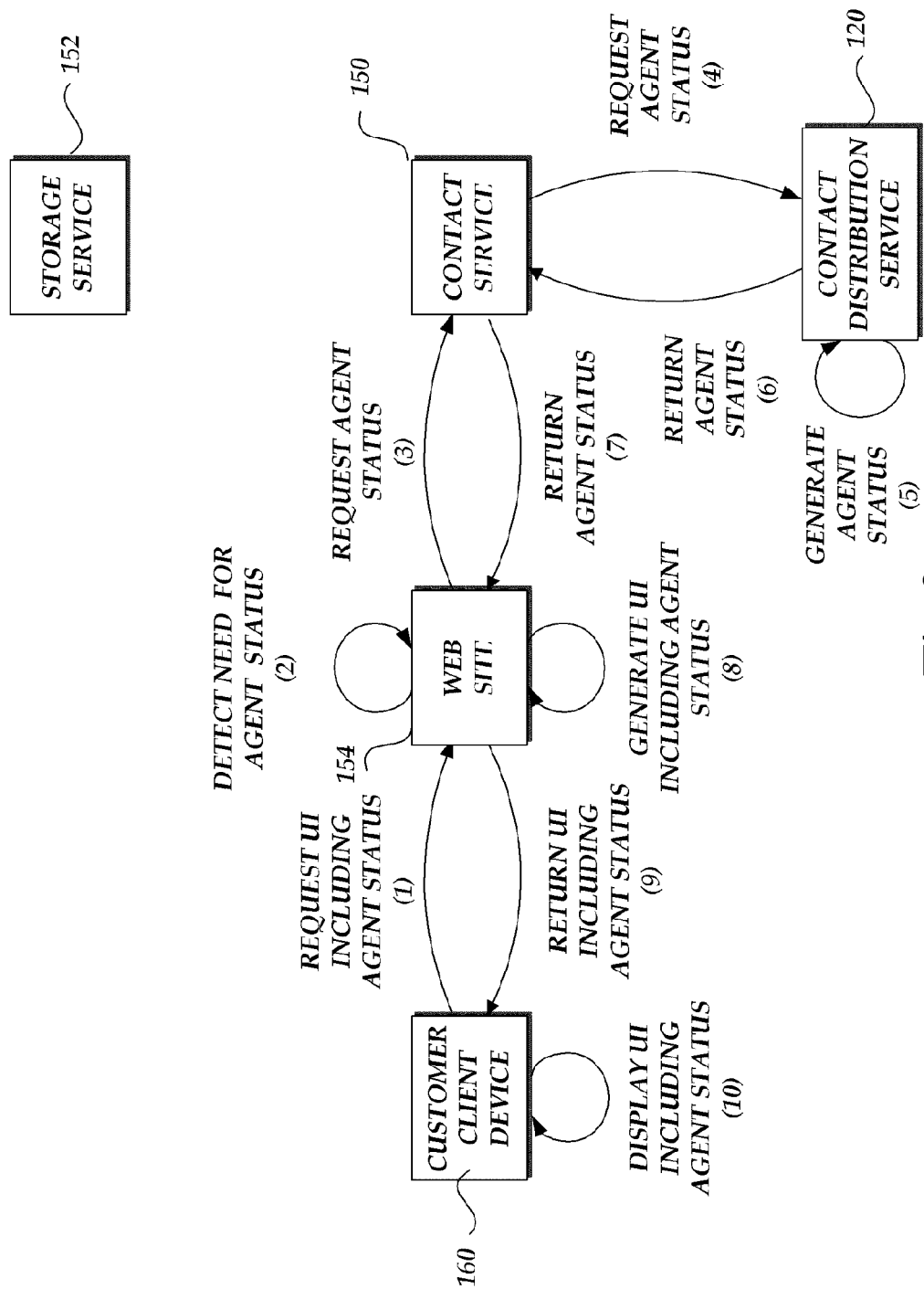
FIG. 2 is a block diagram of the operating environment of FIG. 1, illustrating the contact service providing a contact status to a website in response to a request by a customer client device for a user interface that includes an agent status.

FIG. 2 is a block diagram of the operating environment of FIG. 1, illustrating the customer requesting a user interface from the website 154 which includes the status of CSAs of the website. A customer may communicate with website 154 via user interfaces 156 displayed by the customer client device 160 to access any network-based services provided by the website 154. When the customer has a problem or question displayed in one or more of the user interfaces 156 provided by the website 154, the customer may employ the user interfaces 156 to request the status of customer service agents of the website. In this manner, the customer may identify whether CSAs are available for assistance. As depicted in FIG. 2, the customer may submit a request for a user interface including agent status using the customer client device 160.

For example, the request may comprise a request for a web page containing the agent status. The request is transmitted to the website 154, which detects that the agent status is needed to respond to the customer request and submits an agent status request to the contact service 150.

The contact service 150, in turn, submits the request for agent status to the contact distribution service 120, which generates and returns the agent status. In one embodiment, a real-time availability of the CSAs may be generated by the contact distribution system 120 through communication with the CSAs. For example, to signal availability to the system, a CSA may press a key or select a user interface control from the CRM user interface 111 on the computing machine 107. The contact controller service 102 may thereafter, via the connectivity controller 103, initiate a call to the CSA, for example, via the CSA's phone system 106. The CSA may answer this call to signal to the system that he or she is ready and able to accept calls from customers.

If no customer is waiting for service, the CSA may maintain this silent-open (i.e., off-the-hook) connection to the system to indicate continued availability. To signal a transition from availability to unavailability (for example, to take a lunch or coffee break), the CSA may simply hang up the phone. The severed connection to the connectivity controller 103 or selected unavailable status may signal to the contact controller service 102 and CRM 101 that a CSA is indicating that he or she is no longer available to take a customer contact (or that a CSA has been unintentionally cut off from the system, due to, for instance, a fault in the network).

If the CRM system 101 is down, the CSA may not be able to press or click a user interface control to signal availability to system, or when the CSA does click a user interface control, the CSA might not enter into the available state and therefore not receive calls. Some embodiments may include a phone-system-based interactive voice application that will allow CSAs to signal their availability through their phone system 106.

It will be appreciated that a silent-open connection is not necessary for operation of the system. In alternative embodiments, CSAs may signal availability by accessing a control on the user interface 111 or another device. The contact controller 102 may then direct the connectivity controller 103 to connect to the CSA's phone device 106, such as by calling it, when the contact controller 102 has a customer to connect to the CSA.

Beneficially, by placing the burden of signaling availability on the CSA, the contact distribution system maintains a highly accurate, real-time indication of CSA availability at all times. As opposed to static mechanisms of determining agent status, such as hours of operation, this real-time availability is highly adaptive to changes in agent availability and provides nearly instantaneous updates to agent status. Thus, the likelihood of the agent status being out of date when provided to the customer is low, helping to ensure that customer expectations are met during any subsequent contact between the customer and CSA (e.g., low wait time, CSA possesses appropriate skills to assist the customer, etc).

The agent status returned to the contact service 150 may be further transmitted to the website 154 for ultimate presentation to the customer. Upon receiving the agent status, the website 154 may generate the user interface including the agent status that was requested by the customer. The generated user interface may then be provided to the customer client device 160 for display to the customer.

Figure 3:
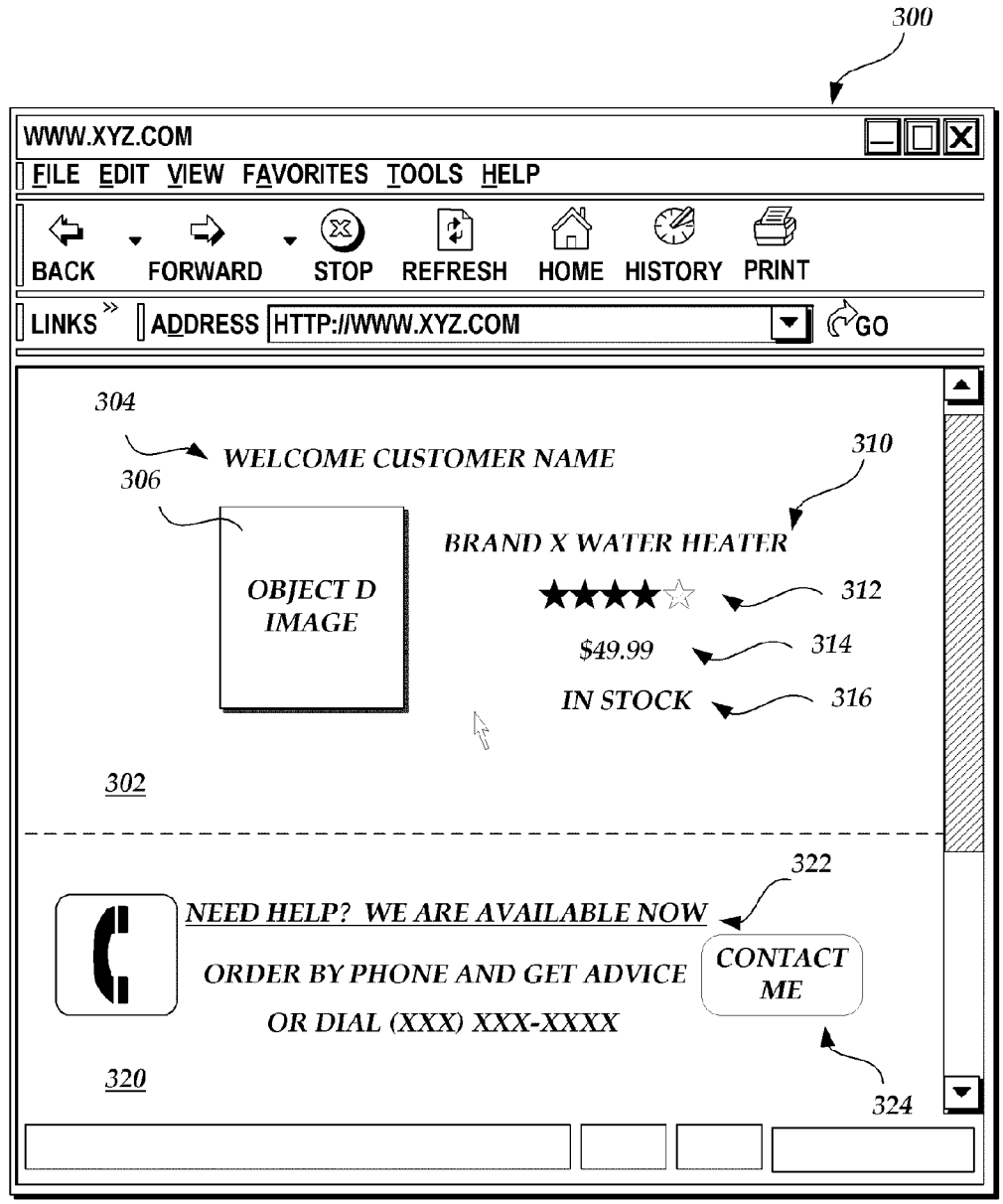
FIG. 3 is an illustrative user interface for display on the customer client device that includes an agent status.

FIG. 3 illustrates one embodiment of a user interface 300, including an agent status, that is displayed on the customer client device 160. The user interface 300 is generated by the website www.xyz.com and includes an item for sale in a first window 302 and help information in a second window 320. The user interface 300 may further include biographical information 304 regarding the customer, if available to the website 154, such as the customer name. The user interface 300 may further include an image 306 of the item of interest (i.e., object D), as well as additional purchase details regarding the object that are available from the website 154. For example, the purchase details may include a name of the object 310, a price 312, a rating 314, a description, and an indication 316 of available inventory for the item of interest. Those skilled in the art will recognize that the purchase details depicted in FIG. 3 are illustrative and that additional or different purchase details may be included in the user interface 300.

The help window 320 of the user interface 300, may further include a greeting 322 that indicates the agent status, contact information for the CSA 324, and a contact user interface control 326. In an example, the agent status may be indicated as "available" or "unavailable." When the agent status is "available," the customer may employ a contact user interface control 326 to contact the CSA. Selecting the contact user interface control 326 may submit a contact request to the website 154 which enables contact to be established in a short period of time. Such a contact user interface control is often referred to as a "click-to-call" control.

In certain embodiments, when the agent status is "unavailable," the contact user interface control 326 may be absent from the user interface 300. Accordingly, the user interface 300 may be provided by the website 154 in order to indicate to the customer that no CSAs are available for communication at the present time and no communications can be accepted. The contact user interface control 326 may also be provided in the user interface 300 to enable the customer to provide contact information that can be used by a CSA to contact the customer at a later time. Selecting the contact user interface control 326 may submit a contact request to the website 154 which enables contact to be established at a later time when CSAs are available.

Figure 4A:
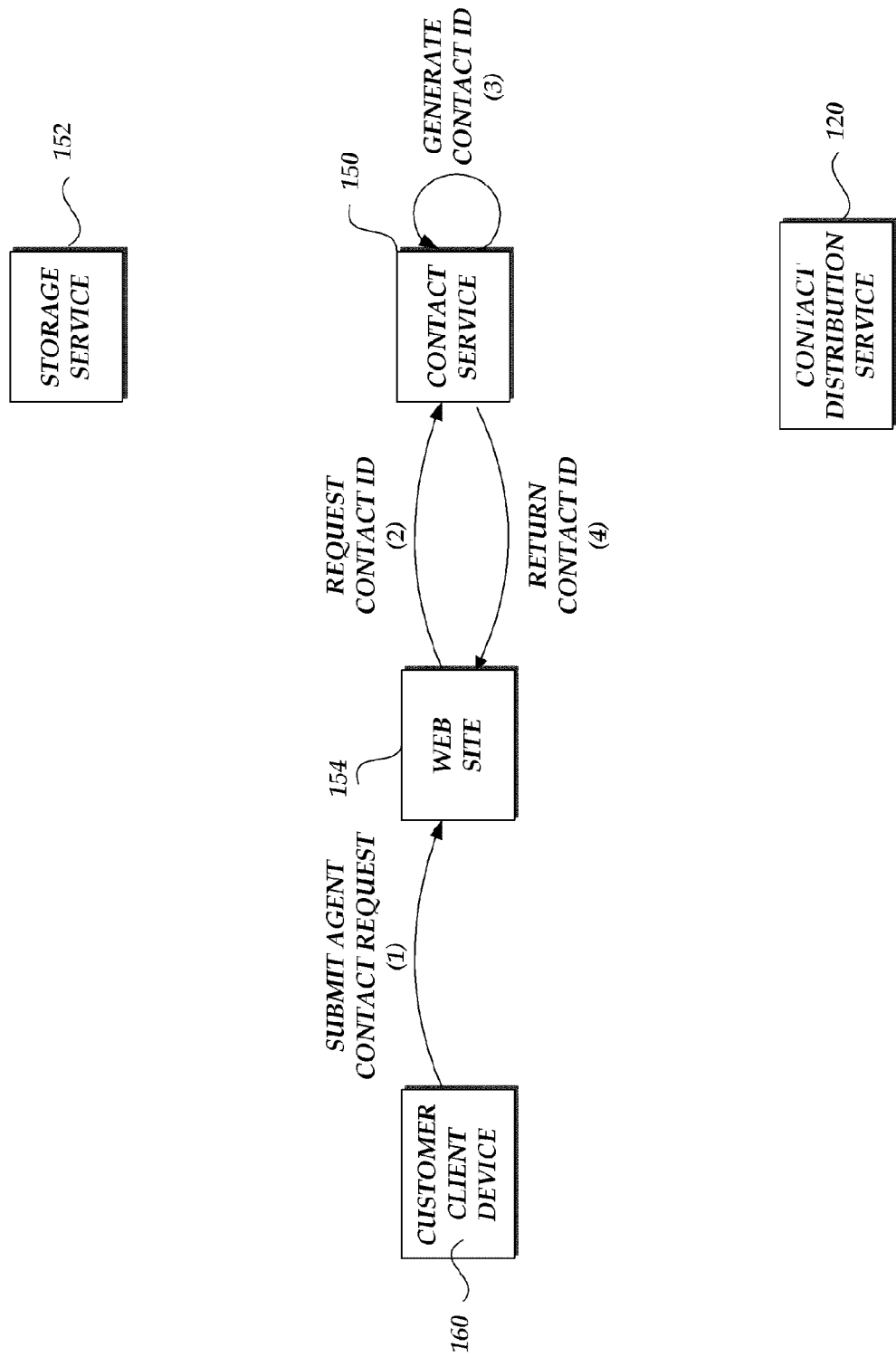
FIG. 4A is a block diagram of the operating environment of FIG. 1, illustrating the contact service returning a contact identifier to the website in response to a request by a customer client device for contact with a customer service agent.

FIG. 4A illustrates a block diagram of the operating environment 100 of FIG. 1, illustrating a contact request being submitted to the website 154. A customer, upon receiving the agent status in a user interface, such as illustrated in FIG. 2, may decide that she wishes to communicate with a CSA. A request to contact a CSA may be submitted, for example, by the customer selecting the contact control 326 in user interface 300. Upon receipt of the contact request, the website 154 submits a request for a contact identifier (contact ID) to the contact service 150. The contact identifier is an identifier that uniquely identifies a requested user contact to the contact service. As discussed in greater detail below, information generated during the process of establishing contact between the customer and CSA may be associated with the contact identifier. This association enables the contact service 150 to properly identify information associated with the contact request so that responses appropriate to the contact request are returned to the website 154. Upon receipt of the contact ID request, the contact service 150 generates the contact ID and returns the contact ID to the website 154.

Figure 4B:
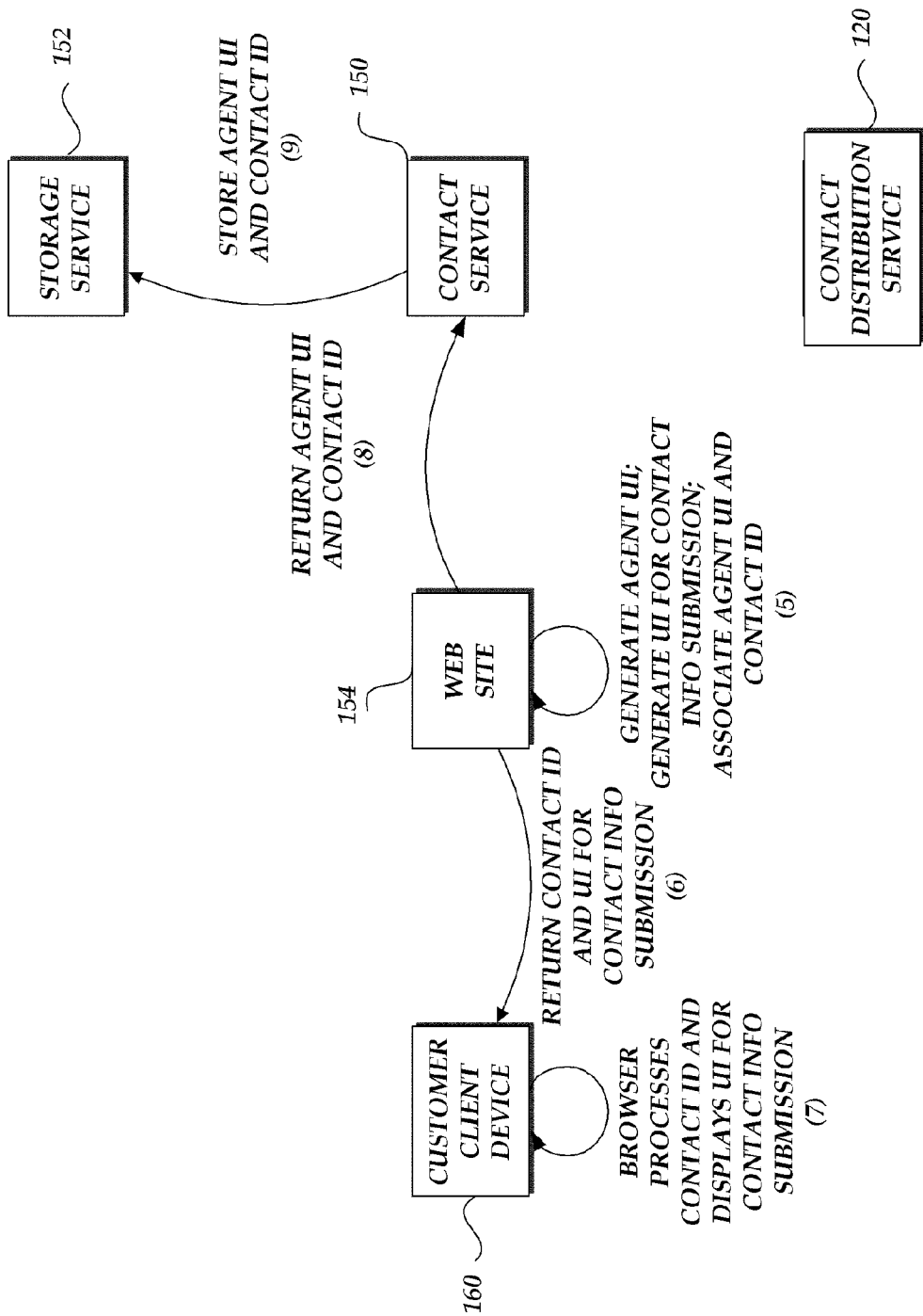
FIG. 4B is a block diagram of the operating environment of FIG. 1, illustrating the website returning a user interface to the customer client device for submission of customer contact information and returning a customer service agent interface to the contact service.

After the website 154 receives the contact ID, the website 154 proceeds to generate and distribute one or more user interfaces in response. FIG. 4B illustrates a block diagram of the operating environment 100 of FIG. 1, illustrating the website response to receipt of the contact ID. In one aspect, the website 154 may generate an agent user interface 111 for use by the CSA. The website 154 may further associate the agent user interface 111 with the contact ID and provide each to the contact service 150. The contact service 150 may store the agent user interface and contact ID for later use when contact between the customer and CSA is established.

In another aspect, the website 154 may generate a user interface for use by the customer to submit customer contact information for establishing contact with a CSA. The website 154 may further associate this user interface with the contact ID and provide each to the customer client device 160. In this manner, contact information subsequently submitted by the customer may be associated with the contact ID, ensuring that the contact service 150 responds properly to contact requests from the customer client device 160.

Figure 5:
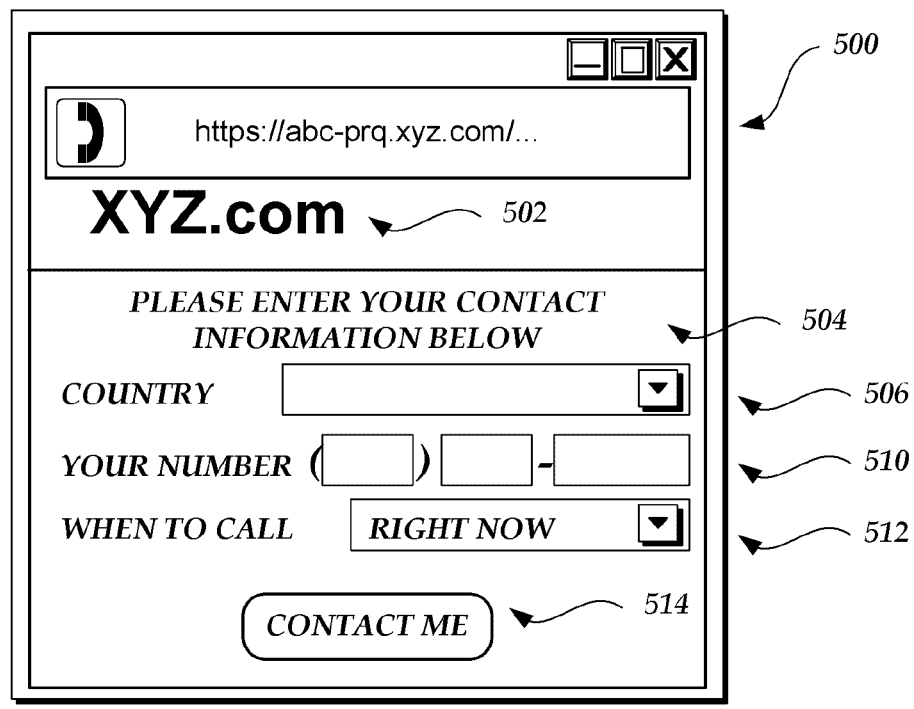
FIG. 5 is an illustrative user interface for display on the customer client device that enables a user to submit customer contact information to the website.

FIG. 5 is an embodiment of a user interface 500 displayed on the customer client device 160 which enables a customer to submit contact information to the website 154. The user interface 500 may include an identifier associated with the website 154. For example, the identifier 502 may include graphics, logos, and the like. The user interface 500 may further include instructions 504 to the customer for entry of contact information, such as "Please enter your contact information below." The contact information may include one or more of the customer country 506, phone number 510, and a time 512 to contact the customer.

The time 512 provided in the user interface 500 may be varied, depending upon the agent status. When the agent status is "available," the customer may enter an arbitrary contact time, reflecting the current availability of the CSAs. When the agent status is "unavailable," the customer may be limited to selected times. For example, selection options for time 512 under these circumstances may include "first available," a time range, or a proposed time. The time range or proposed time may, in an embodiment, be offset from the current time by a selected amount, reflecting the current lack of availability of CSAs.

It may be understood that other customer contact information may be submitted in lieu of or in addition to that discussed above, such as an electronic mail address, an instant messaging address, and a user account for another network-based service. The customer may submit the contact information by selection of a user interface control 514.

Figure 6A:
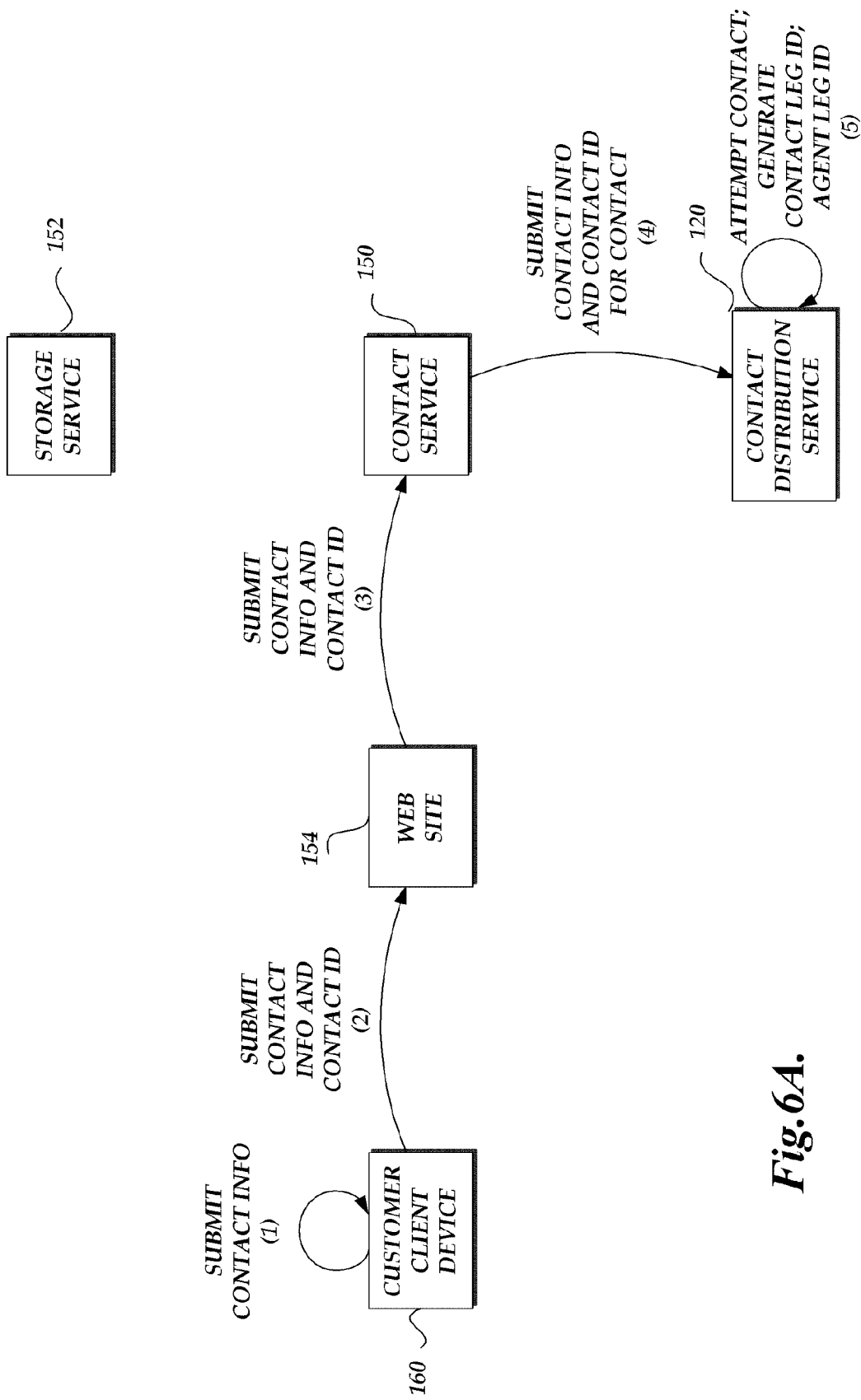
FIG. 6A is a block diagram of the operating environment of FIG. 1, illustrating the contact distribution service attempting to contact the customer in response to receiving customer contact information.

Upon being displayed, a user interface which enables the entry of customer contact information, such as illustrated in FIG. 5, may be employed by the customer to enter his or her contact information to continue the process of contacting a CSA. FIG. 6A is a block diagram of the operating environment 100 of FIG. 1, illustrating the website 154 submitting customer contact information to the website 154 for contact with a CSA. As illustrated in FIG. 6A, the submission may further include the contact ID previously generated by the contact service 150 for the contact. The website 154 further submits the contact information and the contact ID to the contact service 150, which in turn passes this information to the contact distribution service 120.

The contact distribution service 120 may also attempt to contact the customer using the customer contact information received from the contact service 150. In one embodiment, the contact distribution service 120 may be unable to establish contact with the customer. For example, the contact information provided to the contact distribution service 120 may be invalid or a network problem may inhibit establishing contact. In other embodiments, the contact distribution service may successfully establish contact with the customer. Examples of successful contact may include a phone ringing when a call to the customer is attempted and the customer answering a call attempt. In other embodiments, where the contact is not performed by telephone, examples of successful contact may include an acknowledgement that an instant message, SMS message, video message, or other form of electronic message has been successfully received.

Figure 6B:
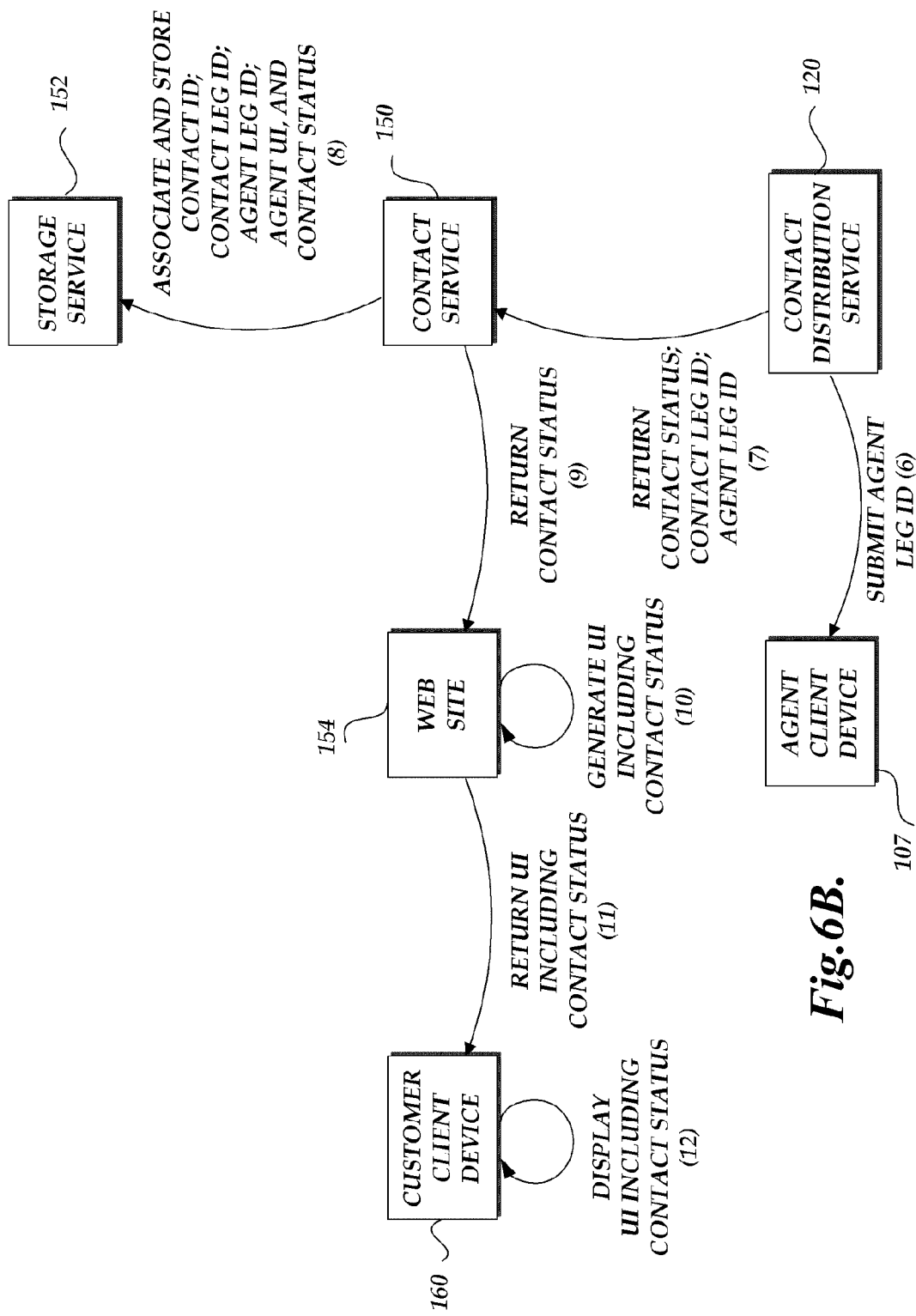
FIG. 6B is a block diagram of the operating environment of FIG. 1, illustrating the contact distribution service returning the contact status for display to the user.

Upon making a contact attempt, the contact distribution service 120 may return a contact status to the contact service 150. FIG. 6B is a block diagram of the operating environment 100 of FIG. 1, illustrating the contact distribution service 120 returning the contact status to the contact service 150. The contact status represents the status of the contact between the customer and the customer service agent in response to a request for contact. When a successful contact is achieved, the contact distribution service 120 may also generate and return a contact leg identifier (contact leg ID) to the contact service 150. The contact leg ID may represent an identifier which uniquely identifies a successful contact to the contact distribution system 120. When a successful contact is achieved, the contact distribution service 120 may also generate an agent leg identifier (agent leg ID). The agent leg ID may be returned both to the contact service 150 the agent client device 107. The contact leg ID may represent an identifier which uniquely identifies a contact between an agent and the contact distribution service.

Upon receiving the contact leg ID, agent leg ID, and contact status, the contact service 150 may associate this information together with the contact ID and agent user interface and store each in the storage service 152. In this manner, the contact service 150 may associate information received for transmission to the contact distribution system 120 with the appropriate contact. For example, as discussed below, customer queries generated by the customer using the customer client device 160 may be identified with a particular contact maintained by the contact distribution system 120.

As also illustrated in FIG. 6B, the contact status may be further transmitted to the website 154. At the website 154, a user interface may be generated which includes the contact status. As discussed above, the reconfigured user interface may be generated with or without the use of user interface templates. Once generated, the user interface including the contact status may be transmitted to the customer client device 160 for display to the customer.

The contact status may also change dynamically during the course of communication between the customer and the CSA. In the event of a change in status, the contact distribution system 120 may update the contact status associated with a contact leg ID and provide the updated contact status to the contact service 150. As the contact service 150 has previously associated the contact leg ID with the contact ID, the contact service 150 may identify the contact status to be updated with the appropriate contact. The contact service 150 may further store the updated contact status and provide the updated contact status to the website 154. The website 154 in turn may generate an updated user interface including the updated contact status for display by the customer client device 160.

A variety of contact statuses may be presented to the customer to reflect the changing status of the contact. Examples of contact status may include, but are not limited to, connecting, connected, hold, and end. The connecting status may be indicated while the contact distribution service is attempting to make contact with the user. For example, the connecting status may be displayed to the customer after a customer phone number has been dialed but prior to customer pick up of the phone. The connected status may be indicated after a customer phone number has been dialed and the customer has picked up the phone. The hold status may be indicated after a customer has picked up the phone but a CSA or the contact distribution service 120 has put the customer on hold. The end status may be indicated after an established contact is terminated, for example, by a customer or CSA. It may be understood that these contact statuses are discussed as examples and other statuses may be returned by the contact distribution system 120 without limit.

In an additional embodiment, contact between the customer and a CSA may be reinitiated at a later date (e.g., the customer may be called back) in lieu of, or after, placing the customer on hold. In an example, a user interface may be returned that provides the customer with the option to reinitiate contact, rather than being placed on hold. In another example, a user interface displaying the option to reinitiate contact may be presented to the customer after the customer has been placed on hold for a selected duration of time. In a further example, contact with the customer may be automatically reinitiated at a later date, either in lieu of placing the customer on hold, or after the customer has been placed on hold for a selected duration of time.

The time at which contact is reinitiated with the customer may be determined through a variety of different mechanisms. In one example, contact may be reinitiated by the contact distribution service 120 and/or the CSA at an arbitrary time (e.g., first available CSA) or a scheduled time window (e.g., within 24 hours from the time of the first contact). In another example, the time of the reinitiated contact may be scheduled by the customer (e.g., through the user interface). In circumstances where the contact reinitiation time is designated for the customer (e.g., automatically), an estimate of when contact may be reinitiated may be provided to the customer.

Figure 7A:
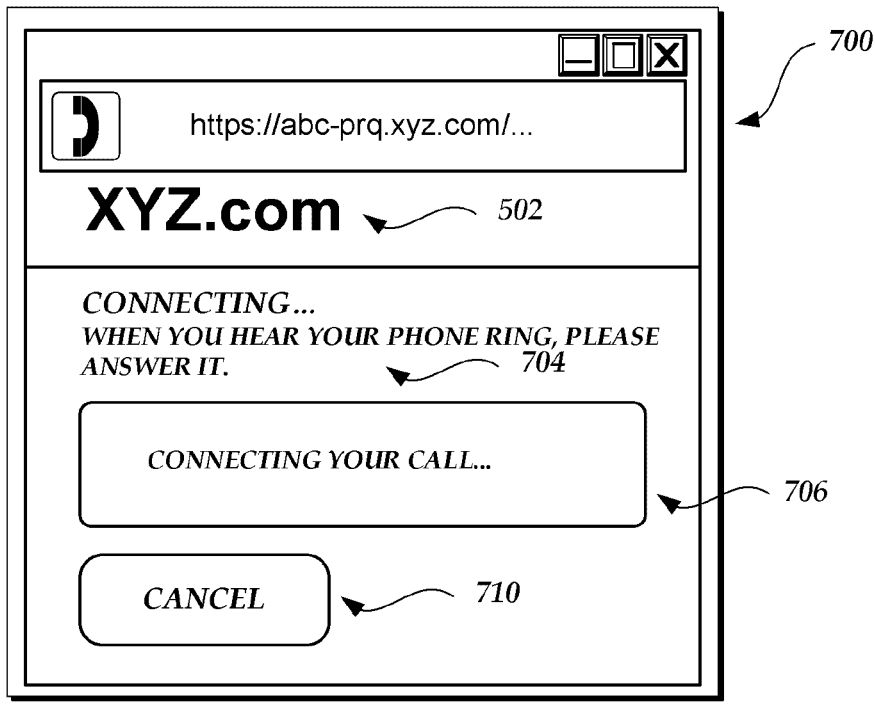
FIGS. 7A and 7B are illustrative user interfaces displayed on the customer client device for enabling a user to view the contact status.
Figure 7B:
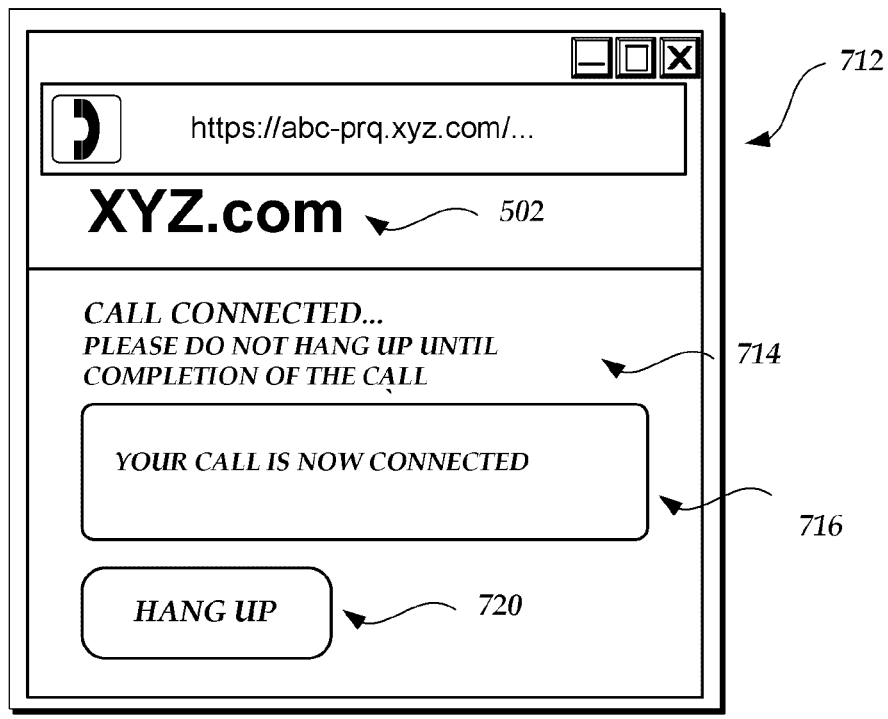

FIGS. 7A and 7B present examples of user interfaces 700, 712 displayed on the customer client device 160 which present the contact status to the customer. FIG. 7A illustrates a user interface 700 generated for presenting the "Connecting" status to the customer, while FIG. 7B illustrates a user interface 712 generated for presenting the "Connected" status to the customer. As discussed with respect to FIG. 5, the user interfaces 700, 712 may include a selected identifier 502 associated with the website 154. For example, the identifier 502 may include graphics, logos, and the like. The user interfaces 700, 712 may further include instructions 704, 714 to the customer which inform the customer as to any actions they should or should not take. The user interfaces 700, 712 may additionally include the contact status 706, 716. The user interfaces 700, 712 may further include user interface controls such as 710, 720 which allow the customer to end contact with a CSA.

The user interfaces 700, 712 may also present other contact statuses that may be of interest to the customer with respect to their communication with the CSA. In an example, if the customer is in communication with a CSA, a contact status indicating a duration of communication between the user and a CSA may be displayed to the customer. In another example, if the customer has been connected to the contact distribution service 150 but is not yet in communication with a CSA, contact statuses indicating the time duration over which the customer has waited to communicate with a CSA and/or an estimated time to communicate with a CSA may be displayed.

Figure 8A:
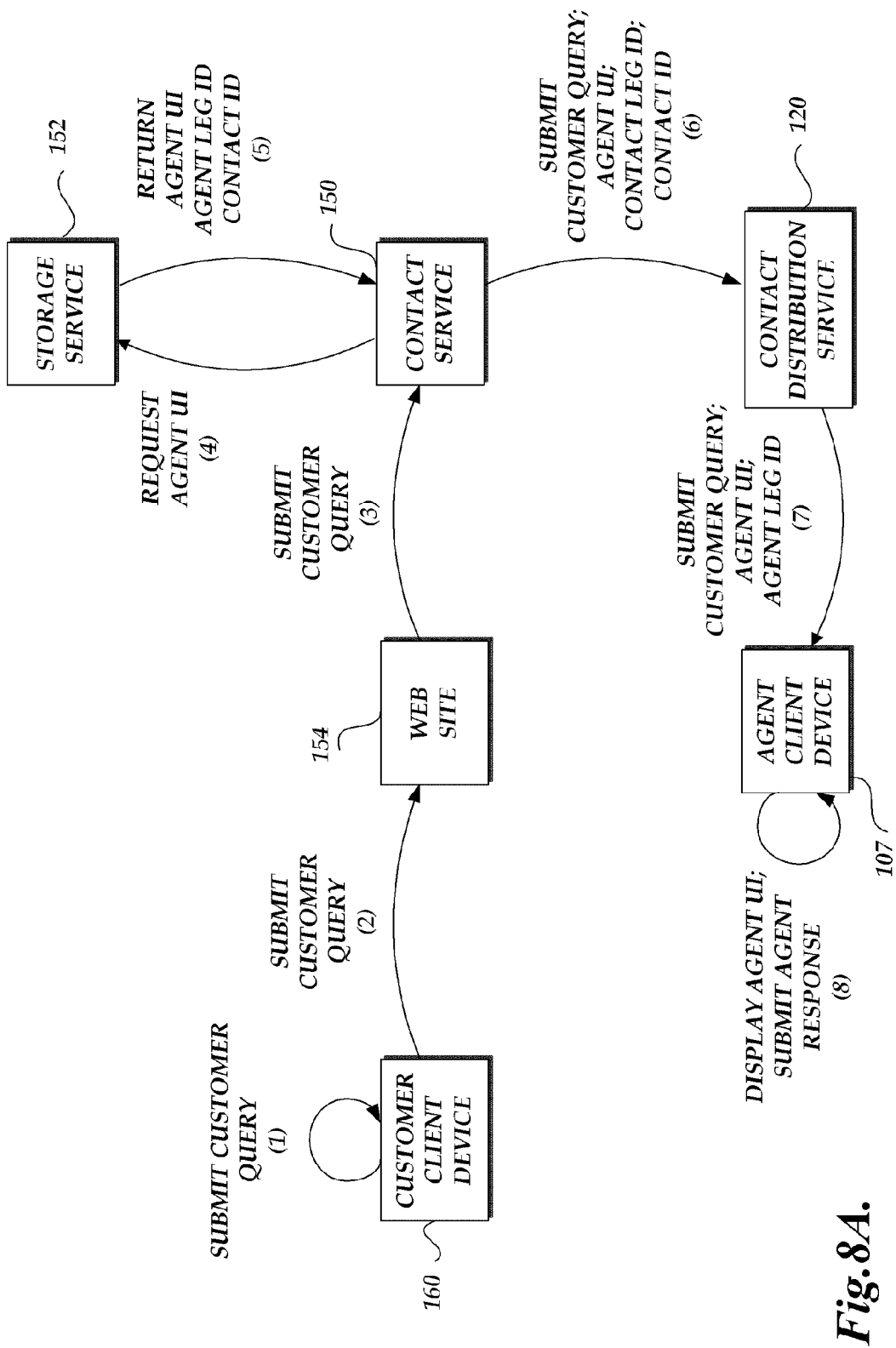
FIG. 8A is a block diagram of the operating environment of FIG. 1, illustrating an agent client device generating a response to a customer query.

Once contact has been successfully established between the customer and the CSA, the customer may proceed to communicate with the CSA. For example, the customer may wish to ask the CSA one or more queries. FIG. 8A is a block diagram of the operating environment 100 of FIG. 1, illustrating the submission of a customer query by a customer. For example, a user interface may be presented to the user that enables the submission of customer queries using one or more of text, voice, and video. For example, user interfaces, such as 700, 712 may be further modified to enable submission of text, voice, and/or video input. In certain embodiments, the contact ID may be further submitted with the customer query. The customer query and contact ID may be submitted to the website 154, where they are subsequently transmitted to the contact service 150.

The contact service 150 may receive the customer query and identify a previously generated agent user interface according to the contact ID stored in the storage service 152. The agent user interface, as well as the contact ID and agent leg ID may be retrieved from the storage service 152 and provided to the contact distribution service 120 to facilitate the agent response to the customer query. The customer query, agent user interface, and agent leg ID may also be forwarded to the agent client device 107 via the contact distribution service 120. The agent leg ID may assist the agent in identifying the contact to which the customer query belongs, facilitating the generation of a return agent response.

The agent response may include any type of response appropriate to the customer query. In an embodiment, the agent response may be provided in the same contact type as the query. For example, if the customer query regarding shipping of an item, an agent response may be delivered in the telephone call. The agent response may be further provided using a different contact type than the query. For example, further assuming that the customer query regarding shipping of an item is submitted in a telephone call, the agent response may be delivered in a telephone call and additional instructions may be electronically mailed to an e-mail address of the customer's choice.

After the CSA submits their response to the customer query, the agent response may be returned to the customer.

Figure 8B:
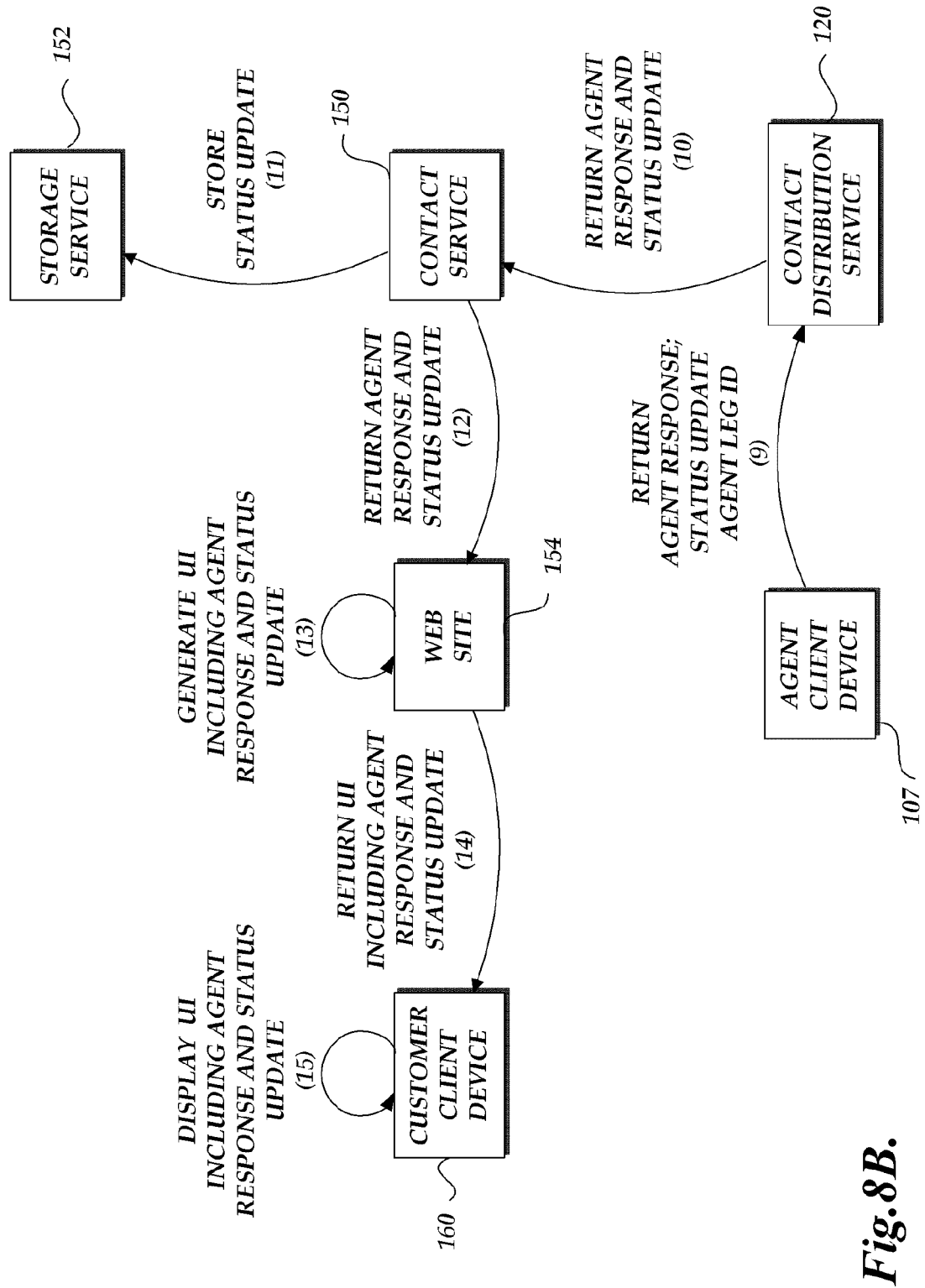
FIG. 8B is a block diagram of the operating environment of FIG. 1, illustrating the agent client device returning an agent response to the customer query and contact status update for display to the customer.

FIG. 8B is a block diagram of the operating environment of FIG. 1, illustrating an agent response returned to the customer client device 160. As necessary, a contact status update may be provided with the agent response. For example, the customer may submit a query which requires the CSA to acquire additional information for the response. In such a case, the CSA may respond that more information is necessary to be responsive and the contact status may be changed from "connected" to "hold" to reflect that the contact is still active but that the CSA will be non responsive until the additional information is acquired. In another example, the agent response may end the contact. In such a case, the CSA may provide their final response and the contact status may be changed from "connected" to "end." The agent leg ID may further be provided with the agent response to identify the contact associated with the agent's response.

The agent response and status update are returned to the contact service 150. As discussed above, upon receiving the agent response and status update, the contact service 150 may update and store the updated contact status in the storage service 152. The contact service 150 may further provide the agent response and status update to the website 154. As discussed above, a user interface including the agent response and status update may be generated with or without the use of user interface templates. Once generated, the user interface including the agent response and status update may be transmitted to the customer client device 160 for display to the customer.

Figure 9:
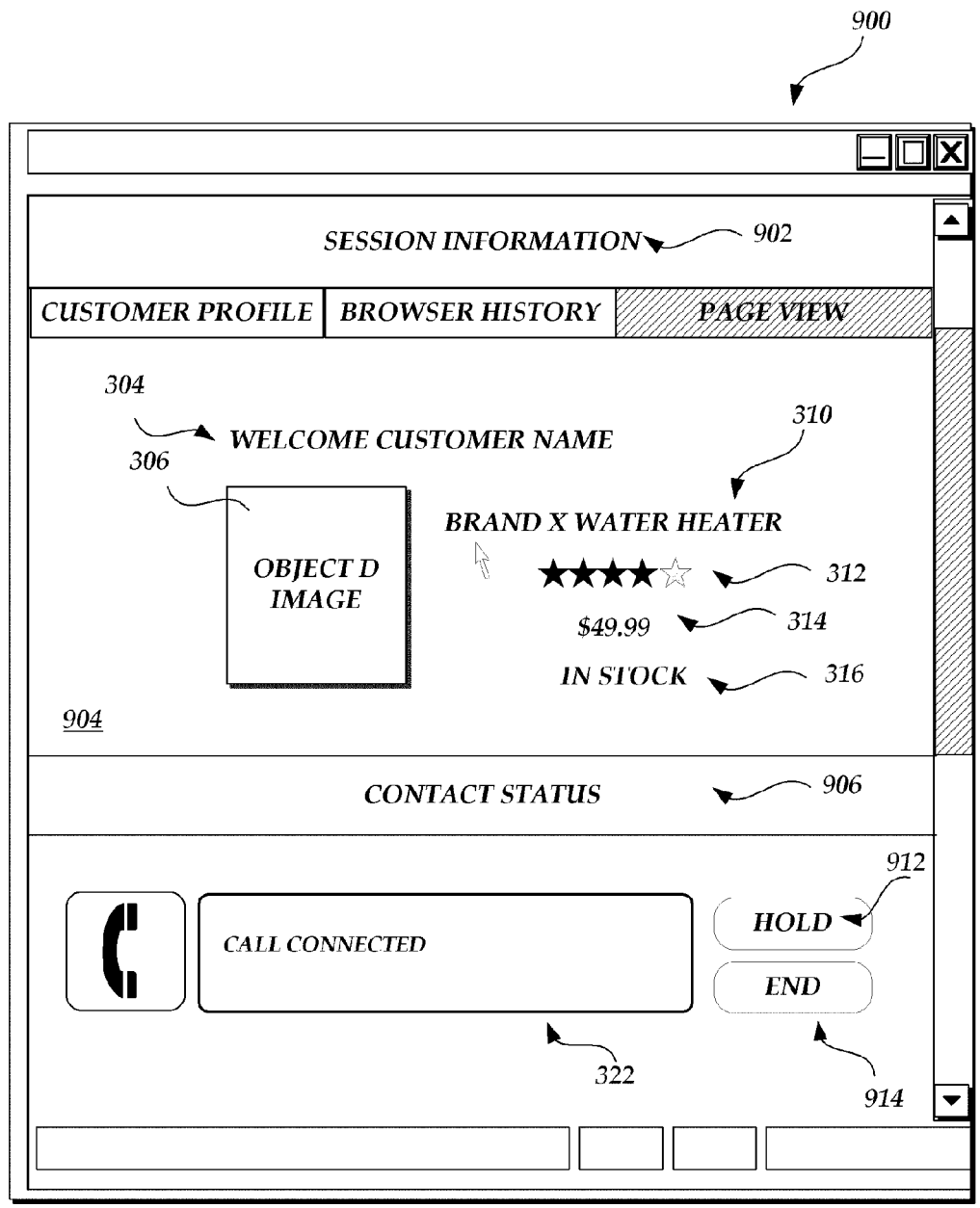
FIG. 9 is an illustrative user interface generated on the agent client device for enabling an agent to view the contact status and other contact session information

FIG. 9 presents an illustrative agent user interface 900 which may be presented to the CSA with the customer query. In an embodiment, the user interface 900 may include a session information window 902 and a contact status window 906. The session information window 906 may include information regarding the customer, including a customer profile, browser history, and a page view. The customer profile may include any information regarding the customer which may help the CSA in their contact with the customer. As discussed above, this information may be maintained by the CRM 101, determined by an IVR during an initial period of contact with the customer prior to communication with a CSA, and/or may be provided by the website 154. Examples of the customer profile may include, but are not limited to, customer biographical information (e.g., name, age, location, etc) and history with the website 154 (e.g., browse history, purchase history, etc.) or contact distribution service (e.g., prior contact history). The browse history may include items which the customer had browsed on the website 154 within a selected duration of time from the contact (e.g., one day, one week, one month, etc.). An illustrative page view 904 of the user interface 900, illustrated in FIG. 9, may include the view of the user interface from which the customer submitted their contact request. For example, the page view 904 may include biographical information 304, image 306 of item of interest, a name of the object 310, a price 312, a rating 314, a description, and an indication 316 of available inventory for the item of interest.

The contact status window 906 may include a contact status display 322 and controls 912, 914 for managing the contact. In an example, the contact status display 322 may display the same contact status which is displayed to the customer, facilitating the CSA's awareness of the contact status with the customer. The controls 912, 914 may include hold control 912 and end control 914. As discussed above, these controls may be employed by the CSA in conjunction with their response, as necessary.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for facilitating contact between a user of a network-based service and a service agent of the network-based service, comprising:
 a contact service in communication with the customer service agent that provides an agent status and a contact status, the agent status representing a current availability of the service agents to communicate with the user and the contact status representing a status of the contact between the user and the service agent; and
 a computing device in communication with the contact service, the computing device operative to:
  generate a first user interface in response to a user request, wherein the first user interface comprises the agent status and enables submission of a request for contact between the user and a service agent to the computing device and wherein the agent status is obtained from the contact service;
  generate a second user interface in response to a user request for contact, wherein the second user interface enables submission of user contact information to the computing device;
  submit received user contact information to the contact service; and
  generate a third user interface, wherein the third user interface comprises the contact status obtained from the contact service in response to the submitted user contact information.

2. The system of claim 1, wherein the first, second, and third user interfaces are configured for display to the user.

3. The system of claim 1, wherein the contact information comprises one or more of a telephone number, an e-mail address, an instant messaging address, and a user account for another network-based service.

4. The system of claim 1, wherein contact between the user and the service agent is performed by one or more of a telephone call, electronic mail, an SMS message, instant messaging, an electronic message that is published or posted for viewing by others, and a video message.

5. The system of claim 1, wherein the first user interface further comprises a contact user interface control for submitting a request for contact between the user and a service agent to the computing device.

6. A system for communication between a user and a service agent, comprising:
 a data store that maintains one or more user interface templates; and
 a computing device in communication with the data store, the computing device operative to:
  obtain a first request from the user for a first user interface, the first user interface comprising an agent status, wherein the agent status represents a current availability of one or more service agents to contact the user;
  obtain a first user interface template from the data store;
  generate the first user interface comprising the first user interface template and the agent status, wherein the agent status is obtained from a contact service in communication with one or more service agents;
  provide the first user interface to the user for display; and
  provide a contact status to the user, the contact status representing a status of a contact between the user and a service agent.

7. The system of claim 6, wherein the computing device is further operative to:
 receive a second request from the user for contact with a service agent;
 obtain a second user interface template from the data store;
 generate a second user interface comprising the second user interface template, wherein the second user interface enables submission of user contact information to the computing device; and
 provide the second user interface to the user for display.

8. The system of claim 7, wherein the computing device is further operative to:
 submit user contact information to the contact service;
 receive the contact status from the contact service in response to submission of the user contact information, the contact status further representative of user contact with the service agent according to the user contact information;
 generate a third user interface comprising the contact status; and
 provide the third user interface to the user for display.

9. The system of claim 6, wherein the first user interface further comprises a contact user interface control for submitting a request for contact between the user and a service agent to the computing device.

10. The system of claim 8, wherein the computing device is further operative to generate an agent user interface for display to the service agent during contact with the user.

11. The system of claim 6, wherein the agent status is based upon availability feedback from the service agents.

12. The system of claim 6, wherein network-based service comprises a network based retailer.

13. The system of claim 6, wherein the contact information comprises one or more of a telephone number, an electronic mail address, an instant messaging address, and a user account for another network-based service.

14. The system of claim 6, wherein contact between the user and the service agent is performed by one or more of a telephone call, electronic mail, an SMS message, instant messaging, an electronic message that is published or posted for viewing by others, and a video message.

15. A computer-implemented method for facilitating communication between a user and a service agent, comprising:
 under control of one or more configured computer systems:
  requesting agent status from a contact service in communication with one or more service agents, the agent status representing a current availability of a service agent to communicate with the user;
  providing the agent status received from the contact service to the user;
  requesting contact with the service agent, the contact request comprising user contact information; and
  providing a contact status received from the contact service to the user in response to user contact information submitted to the contact service.

16. The computer-implemented method of claim 15, further comprising providing the user with the service agent in response to a user query.

17. The computer-implemented method of claim 15, wherein the agent status is based, at least in part, upon availability feedback from the service agents.

18. The computer-implemented method of claim 15, wherein the contact information comprises one or more of a telephone number, an e-mail address, an instant messaging address, and a user account for another network-based service.

19. The computer-implemented method of claim 15, wherein contact between the user and the service agent is performed by one or more of a telephone call, electronic mail, an SMS message, instant messaging, an electronic message that is published or posted for viewing by others, and a video message.

20. The computer-implemented method of claim 15, further comprising:
 receiving a request from the user for a user interface;
 obtaining a user interface template from a data store; and
 generating the user interface, the user interface comprising the user interface template and the agent status received from the contact service,
 wherein providing the agent status received from the contact service to the user comprises providing the user interface to the user for display.

21. A non-transitory computer-readable medium having encoded thereon instructions to present service agent information to a user, wherein the instructions, when executed by a computing apparatus, cause the computing apparatus to:
 request an agent status from a contact service in communication with one or more service agents, the agent status representing a current availability of the service agents to communicate with the user;
 provide the agent status received from the contact service to the user;
 receive a user request for contact with a service agent, the contact request comprising user contact information;
 obtain a contact status from the contact service, wherein the contact status represents a status of contact between the user and service agent; and
 provide the contact status to the user.

22. The non-transitory computer-readable medium of claim 21, wherein the instructions, when executed by the computing apparatus, further cause the computing apparatus to provide the user with the service agent in response to a user query.

23. The non-transitory computer-readable medium of claim 21, wherein the agent status is based, at least in part, upon availability feedback from the service agents.

24. The non-transitory computer-readable medium of claim 21, wherein the contact information comprises one or more of a telephone number, an e-mail address, an instant messaging address, and a user account for another network-based service.

25. The non-transitory computer-readable medium of claim 21, wherein contact between the user and the service agent is performed by one or more of a telephone call, electronic mail, an SMS message, instant messaging, an electronic message that is published or posted for viewing by others, and a video message.

26. The non-transitory computer-readable medium of claim 21, wherein the instructions, when executed by the computing apparatus, further cause the computing apparatus to:
   receive a request from the user for a user interface;
   obtain a user interface template from a data store;
   generate the user interface, the user interface comprising the user interface template and the agent status received from the contact service; and
   provide the user interface to the user.

* * * * *